US008684372B2

(12) United States Patent
Buttazzoni et al.

(10) Patent No.: US 8,684,372 B2
(45) Date of Patent: Apr. 1, 2014

(54) MODULAR DOLLY KIT

(75) Inventors: Luca Buttazzoni, Miami, FL (US); Andres Bernal, Sunny Isles, FL (US)

(73) Assignee: Luca Buttazzoni, Miami, FL (US)

( * ) Notice: Subject to any disclaimer, the term of this patent is extended or adjusted under 35 U.S.C. 154(b) by 0 days.

(21) Appl. No.: 13/533,874

(22) Filed: Jun. 26, 2012

(65) Prior Publication Data

US 2013/0341890 A1    Dec. 26, 2013

(51) Int. Cl.
*B62B 1/00*            (2006.01)

(52) U.S. Cl.
USPC ............................................ 280/35; 280/79.11

(58) Field of Classification Search
CPC ....................................................... B25H 5/00
USPC ................. 280/32.6, 35, 42, 79.11, 638, 651; 248/129, 150
See application file for complete search history.

(56) References Cited

U.S. PATENT DOCUMENTS

| | | | | | |
|---|---|---|---|---|---|
| 189,531 | A | * | 4/1877 | Voorhees | 280/35 |
| 208,650 | A | * | 10/1878 | Tucker | 280/35 |
| 217,172 | A | * | 7/1879 | Tucker | 280/35 |
| RE9,283 | E | * | 7/1880 | Woodruff | 280/35 |
| 378,135 | A | * | 2/1888 | Hess | 280/35 |
| 442,825 | A | * | 12/1890 | Randall | 280/35 |
| 444,020 | A | * | 1/1891 | Rogers | 280/35 |
| 520,319 | A | * | 5/1894 | Kynoch | 280/35 |
| 525,298 | A | * | 8/1894 | Thiele | 280/35 |
| 843,234 | A | * | 2/1907 | Rawlinson | 248/129 |
| 1,461,027 | A | * | 7/1923 | Brockson | 280/638 |
| 1,508,232 | A | * | 9/1924 | Milosy | 280/32.6 |
| 1,887,067 | A | | 11/1932 | Pehrsson | |
| 1,918,604 | A | * | 7/1933 | Johnson | 248/129 |
| 2,048,608 | A | * | 7/1936 | Holland | 248/150 |
| 2,186,368 | A | * | 1/1940 | Conger | 280/35 |
| 2,500,215 | A | * | 3/1950 | Swearingen | 47/40.5 |
| 2,534,367 | A | * | 12/1950 | Perrotta et al. | 280/35 |
| 2,654,421 | A | * | 10/1953 | Neff | 280/35 |
| 2,661,220 | A | | 12/1953 | Davis | |
| D177,208 | S | | 3/1956 | Berlin | |
| 2,869,241 | A | | 8/1958 | Owen | |
| 3,329,442 | A | * | 7/1967 | Di Vietri | 280/35 |
| 3,802,717 | A | * | 4/1974 | Eitreim | 280/79.11 |
| 3,831,959 | A | * | 8/1974 | Fontana | 280/79.11 |
| 3,871,676 | A | * | 3/1975 | Renard et al. | 280/35 |
| 3,923,318 | A | * | 12/1975 | Renard et al. | 280/35 |
| 3,963,256 | A | * | 6/1976 | Stafford | 280/35 |
| 3,964,762 | A | * | 6/1976 | Adams | 280/639 |
| 3,983,821 | A | * | 10/1976 | Kearns | 108/42 |
| 4,178,006 | A | | 12/1979 | Johnson | |
| 4,274,644 | A | | 6/1981 | Taylor | |
| 4,402,506 | A | * | 9/1983 | Jones | 482/70 |
| 4,647,056 | A | | 3/1987 | Baker | |
| 4,725,028 | A | * | 2/1988 | Conradt | 248/150 |
| 4,743,039 | A | * | 5/1988 | Ellis | 280/42 |

(Continued)

*Primary Examiner* — Katy M Ebner
*Assistant Examiner* — Brodie Follman
(74) *Attorney, Agent, or Firm* — Malloy & Malloy, P.L.

(57) ABSTRACT

A modular kit for constructing a dolly comprising of at least one strut having a first and second end, and a first, second, and third through hole; at least one first connector; at least one second connector, each first connector removably attaches to each second connector, hereinafter referred to as a connector assembly, after at least two struts have been modularly assembled, each connector assembly is threaded through either the first, second, or third through holes of each respective strut; and at least one caster assembly, each caster assembly removably attaches to each connector assembly.

18 Claims, 8 Drawing Sheets

(56) References Cited

U.S. PATENT DOCUMENTS

| | | | |
|---|---|---|---|
| 4,969,657 A | 11/1990 | Kaufmann | |
| 5,230,408 A * | 7/1993 | Sadow | 190/18 A |
| 5,726,368 A | 3/1998 | Shaw | |
| 6,179,374 B1 | 1/2001 | Tang | |
| 6,382,643 B1 | 5/2002 | Baker | |
| 6,419,198 B1 * | 7/2002 | Einav | 248/346.07 |
| 6,491,318 B1 | 12/2002 | Galt et al. | |
| 6,776,382 B1 * | 8/2004 | Papadopoulos et al. | 248/346.07 |
| 6,964,423 B1 * | 11/2005 | Chieh et al. | 280/79.11 |
| 7,478,835 B2 * | 1/2009 | Autenrieth | 280/763.1 |
| 8,011,686 B2 | 9/2011 | Chen et al. | |
| 8,205,841 B2 * | 6/2012 | Wood | 248/129 |
| 8,220,824 B2 | 7/2012 | Chen et al. | |
| 2004/0173996 A1 * | 9/2004 | Anderson | 280/651 |
| 2005/0211862 A1 * | 9/2005 | Autenrieth | 248/431 |
| 2006/0097468 A1 * | 5/2006 | Sugrue | 280/79.11 |
| 2007/0029747 A1 * | 2/2007 | Islo et al. | 280/47.35 |
| 2009/0167008 A1 * | 7/2009 | Autenrieth | 280/764.1 |
| 2009/0178821 A1 * | 7/2009 | Zavidniak et al. | 174/51 |
| 2009/0184482 A1 * | 7/2009 | Scott | 280/32.6 |
| 2009/0212514 A1 * | 8/2009 | Moorman, Jr. | 280/32.6 |

* cited by examiner

MODULAR DOLLY KIT

BACKGROUND

The present invention is directed to a modular dolly kit that is composed of at least two modules. The modular dolly kit can be used to transport loads that can range in weight and size.

Wheeled trucks and/or dollies, have been well documented in the art of wheeled trucks. They are usually built of robust materials that are heavy and that are not easy to maneuver or manipulate. For a detailed description of the prior art of dollies, see Chieh et al., U.S. Pat. No. 6,964,423 discloses a collapsible cross arm dolly that has four casters. The invention, although similar to the present invention, does not disclose the features and functions of the present invention. Chieh et al., discloses a collapsible cross-arm dolly that consists of an upper arm and a lower arm of square metallic tubing, with each arm formed with a horizontal offset center portion and with a pair of casters that are attached at each end of both arm's lower surface. The horizontal offset center portion is formed in opposite hand or mirror image of each other, thus permitting them to nest together and are both oppositely flattened to allow nesting on the same horizontal plane. A pivot junction is mutually disposed between the arms, thereby permitting the dolly to form a pivotal right angle cross position, or alternatively, a pivotal parallel arm collapsed position. A gravity-actuated restraint locks and disengages the connection of the upper arm to the lower arm, which permits changing orientation from the right angle cross position to the parallel arm collapsed position. A second embodiment is basically identical except a manual push-button restraint is utilized instead of being operated by a gravity actuated restraint.

The present invention does not use mirror image arms; it uses unique struts that are removably connected by a connector assembly. The present invention is similar to an erector set. The user dictates how many struts will be connected and the shape of the modular dolly. The modular dolly can be shaped to carry objects or loads that have oblong or irregular dimensions.

The present invention can be manipulated to increase or decrease areas that carry loads. The present invention does this by either adding modules (unique struts) to the structure or by adjusting the shape of the collapsible structure by manipulating the spacial relationship of each unique strut in relation to each other. The manipulation of the modular dolly is actuated by the pulling or pushing of the struts into a desired position and then locking the struts. An embodiment of the present invention may also use handles that are placed on the ends of the collapsible dolly. The handles allow any load being carried to be securely contained within the perimeter of the collapsible dolly.

In addition to Chieh et al., the following U.S. Patents are deemed relevant to the present invention: U.S. Pat. Nos. 6,382,643 Baker, May 7, 2002; 4,647,056, Baker, Mar. 3, 1987; 4,274,644, Taylor, Jun. 23, 1981; 2,869,241, Owen, Aug. 26, 1958; and 2,661,220, Davis, Dec. 1, 1953. The Patents were discussed in Chieh et al., and will not be further discussed in the present application.

The dolly of the present invention may be used by moving companies as well as the average home owner. The dolly is easy to store, it is easy to assemble and disassemble, it is easy to manipulate into desired shapes, and it is easy to lock into the desired shapes. The dolly is very inexpensive to manufacture and ship, for the shape of the unique strut can be stacked one on top of each other, unlike Chieh et al.

SUMMARY

The present invention is directed to a modular dolly kit that is easy to store, that is easy to assemble and disassemble, that is easy to manipulate into desired shapes, and that is easy to lock into the desired shapes. The dolly is also very inexpensive to manufacture and ship.

The modular dolly kit of the present invention is comprised of at least one strut having a first and second end, and a first, second, and third through hole; at least one first connector; a least one second connector, each first connector removably attaches to each second connector, hereinafter referred as a connector assembly, after at least two struts have been modularly assembled, each connector assembly is threaded through either the first, second, or third through holes of each respective strut; and at least one caster assembly, each caster assembly removably attaches to each connector assembly.

In a further embodiment of the present invention, the dolly might also comprise of at least one termination. Each termination shall be placed at a desired end of the dolly and shall be locked in place by each connector assembly. Each termination is used to create either a pivot point at each end of the dolly or to insert a handle or any other device needed to move the dolly from one location to another. Each termination is a planar body that defines two termination through holes. One of the termination through holes may be irregularly shaped to accommodate a handle, a post connection, a belt, or any other device that may be used to push or pull the collapsible body into a desired shape. If using a post or a handle, the post or handle can also serve the purpose of containing any object on the surface area of the modular dolly.

The present invention addresses the need in the industry of modular dollies that can be adjusted to meet the user's needs. The present invention allows a user to purchase one kit that can be used to move large, small, or oblong structures. Presently, when transporting oblong structures, usually users have to use a combination of dollies; the present invention will allow a user to assemble the dolly to the dimensions of the oblong structure.

An object of the present invention is to provide a dolly that can be collapsible.

Another object of the present invention is to provide a dolly that can be manipulated into different shapes, thereby allowing the user to transport oblong structures.

Yet another object of the present invention is to provide a dolly that can easily be assembled by the user.

A further object of the present invention is to provide a dolly that does not require tools to assemble.

Yet a further object of the present invention is to provide a modular dolly accordion kit that can be extended to the length desired by the user by simply adding modules to the dolly.

DRAWINGS

These and other features, aspects, and advantages of the present invention will become better understood with regard to the following description, appended claims, and drawings where:

DESCRIPTION

Figure 1:
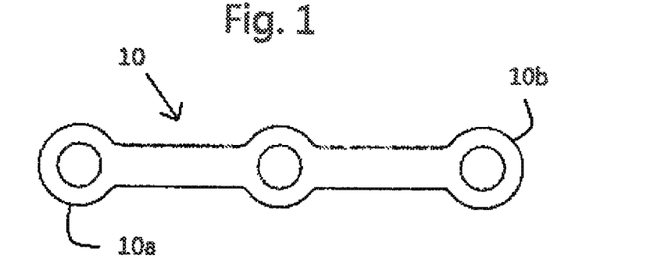
FIG. 1 is a top plan view showing the unique strut of the present invention.
Figure 2:
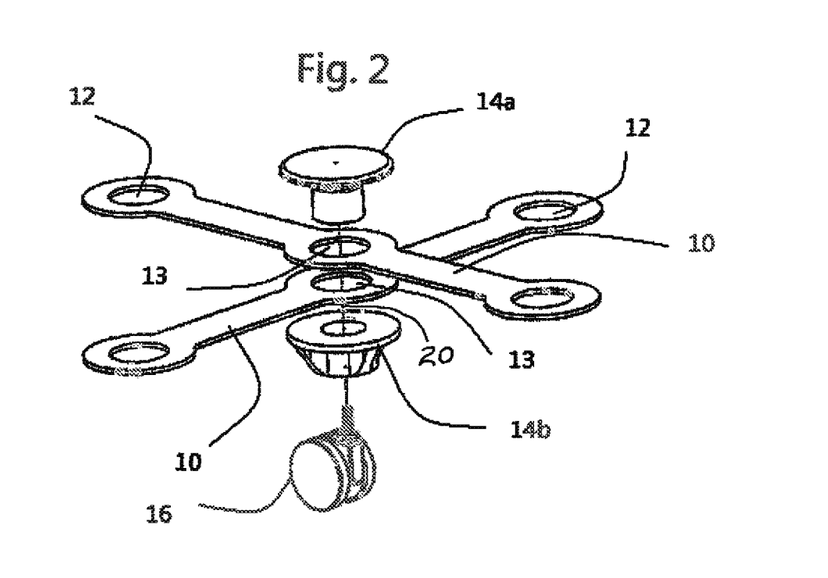
FIG. 2 is a perspective view showing how at least two struts of the present invention would be assembled together at apertures defined within the struts using a locking mechanism and further disclosing a caster that inserted within the locking mechanism.
Figure 3:
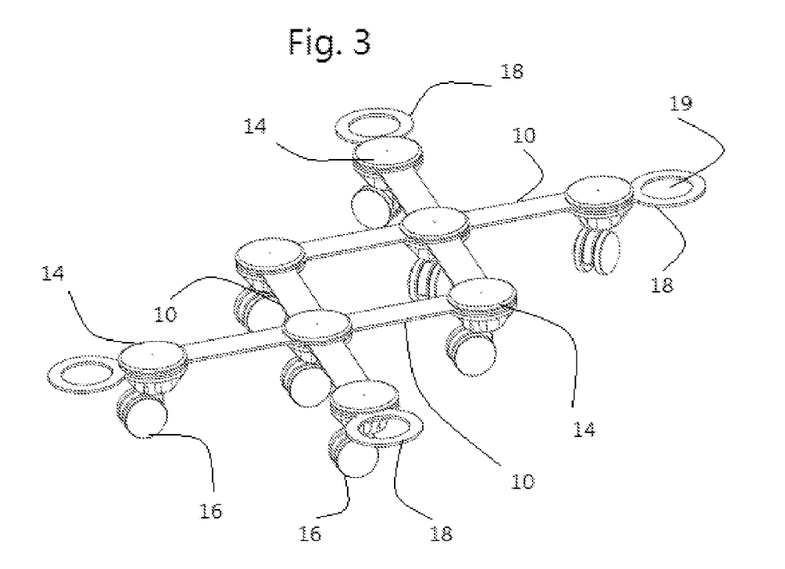
FIG. 3 is a perspective view showing the modular dolly kit of the present invention in an operative, expanded position, wherein four unique struts are used, eight connector assemblies are used, eight casters are used and four terminations are used.

As seen in FIGS. 1-3, a modular kit 100 for constructing a dolly, the kit 100 comprises of at least one strut 10 having a first 10a and second end 10b, and a first 12, second 12, and third through hole 13; at least one first connector 14a; a least one second connector 14b, each first connector 14a removably attaches to each second connector 14b, hereinafter referred as a connector assembly 14, after at least two struts 10 have been modularly assembled, each connector assembly 14 is threaded through either the first 12, second 12, or third 13 through holes of each respective strut 10; and at least one caster assembly 16, each caster assembly 16 removably attaches to each connector assembly 14. In all embodiments, the first 12 and second 12 through holes of each strut 10 are adjacent to the first 10a and second 100b ends of each strut 10 respectively. Each third through hole 13 is approximately equidistant to the first 12 and second 12 through holes of each strut 10.

In another embodiment of the present invention, as seen in FIG. 3, the modular dolly kit 100 further comprises of at least one termination 18, each termination 18 defines two through holes 19, each termination 18 removably attaches to one of the struts 10 using one of the connector assemblies 14.

Figure 4:
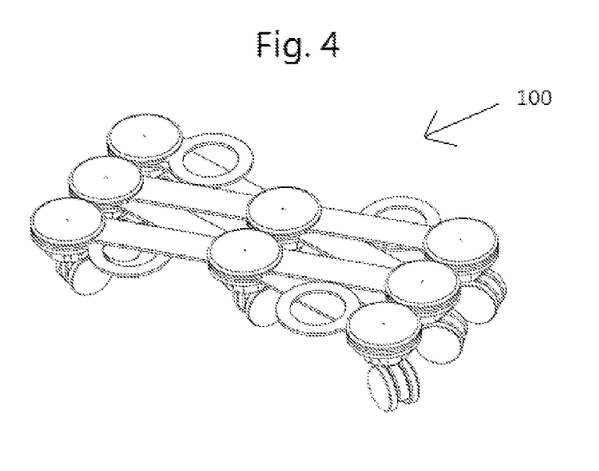
FIG. 4 is a perspective view showing the modular dolly kit of the present invention wherein the plurality of struts are collectively disposed in an accordion configuration, which comprises a collapsed position.
Figure 5:
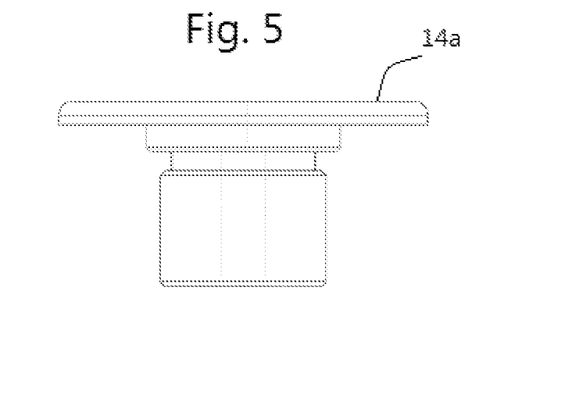
FIG. 5 is a perspective view showing the first connector of the connector assembly of the present invention.
Figure 6:
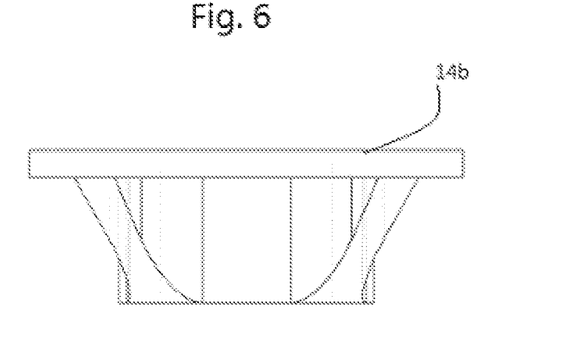
FIG. 6 is a perspective view showing the second connector of the connector assembly of the present invention.
Figure 7:
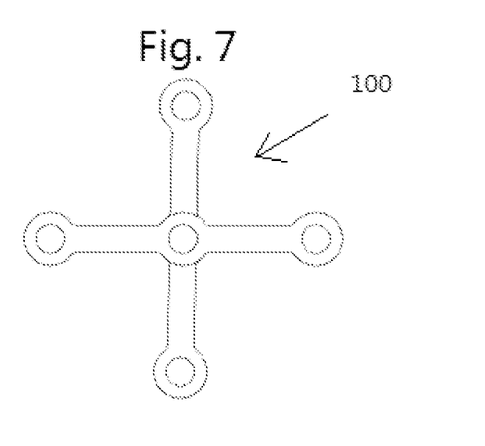
FIG. 7 is a top plan view showing how two struts of the present invention could be attached together using a center to center joint combination.
Figure 8:
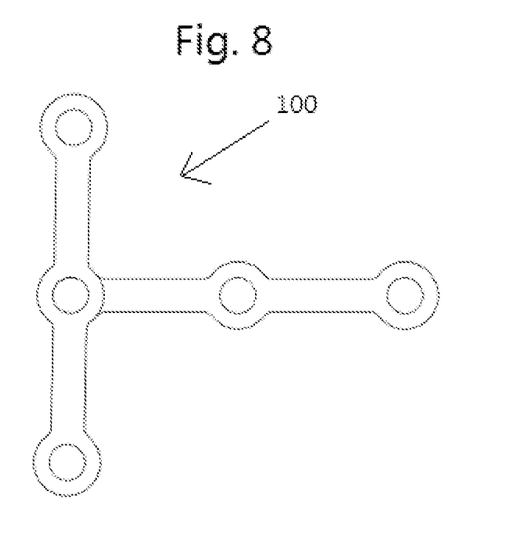
FIG. 8 is a top plan view showing how two struts of the present invention could be attached together using center to edge joint combination.
Figure 9:
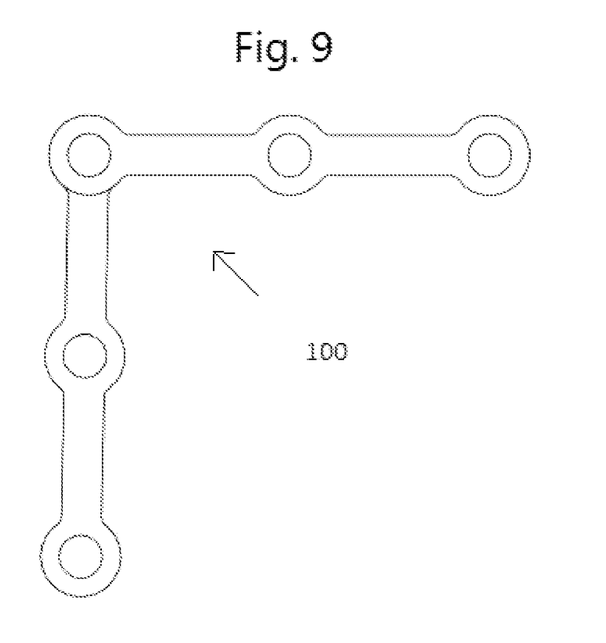
FIG. 9 is a top plan view showing how two struts of the present invention could be attached together using an edge to edge joint combination.
Figure 10:
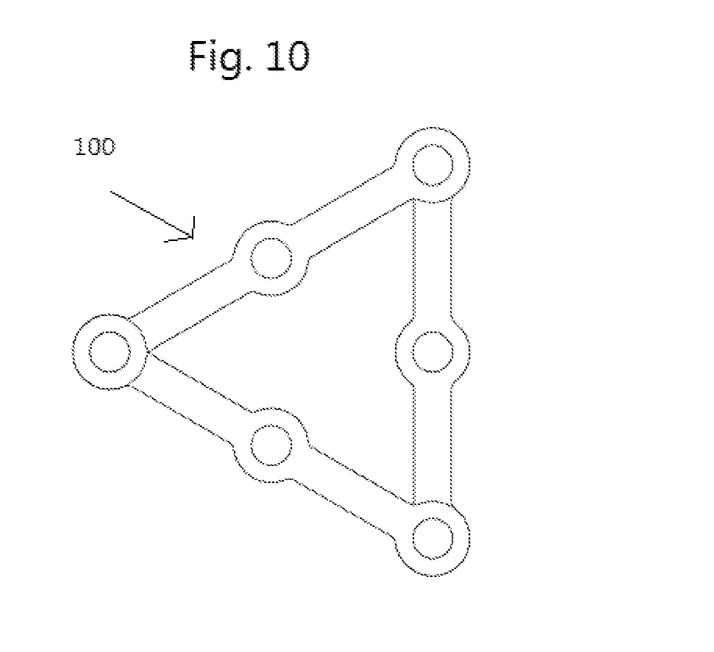
FIG. 10 is a top plan view showing how the unique struts of the present invention can be attached together to form a triangular weight bearing surface.
Figure 11:
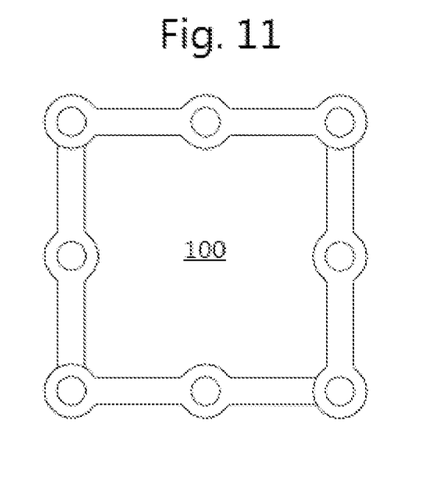
FIG. 11 is a top plan view showing how the unique struts of the present invention can be attached together to form a square weight bearing surface.
Figure 12:
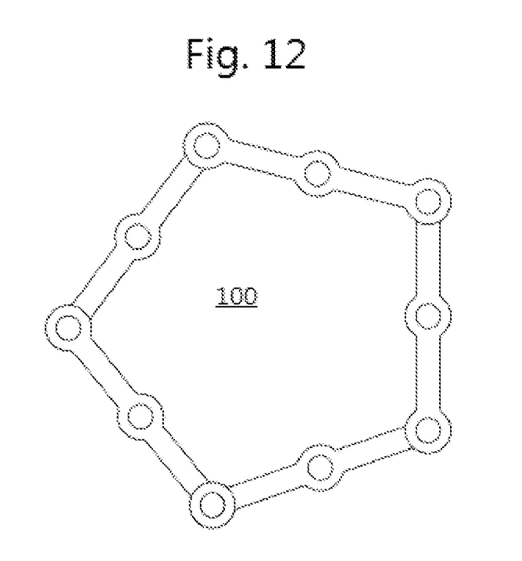
FIG. 12 is a top plan view showing how the unique struts of the present invention can be attached together to form a pentagonal weight bearing surface.
Figure 13:
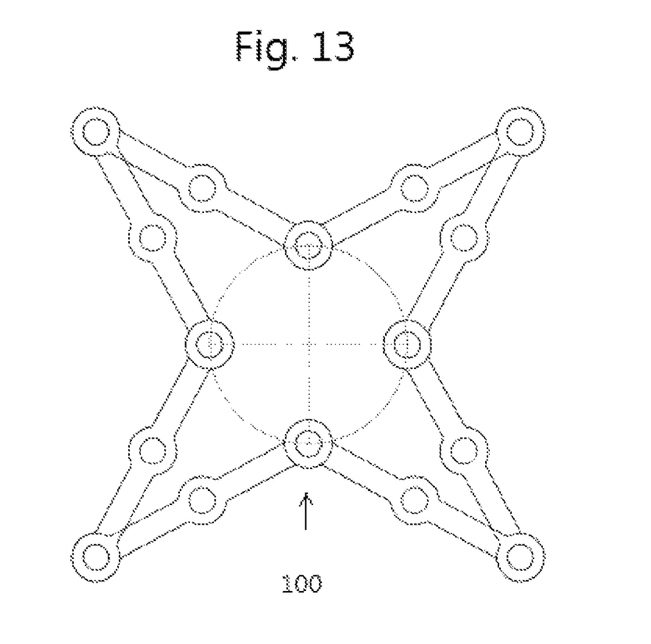
FIG. 13 is a top plan view showing how the unique struts of the present invention can be attached together to form a star shaped weight bearing surface.
Figure 14:
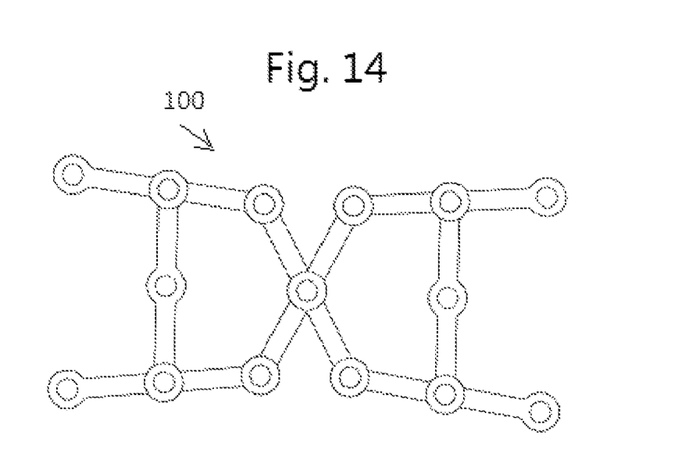
FIG. 14 is a top plan view showing how the unique struts of the present invention can be attached together to form a irregularly shaped weight bearing surface, the view shows center to center, center to end, and end to end connections.
Figure 15:
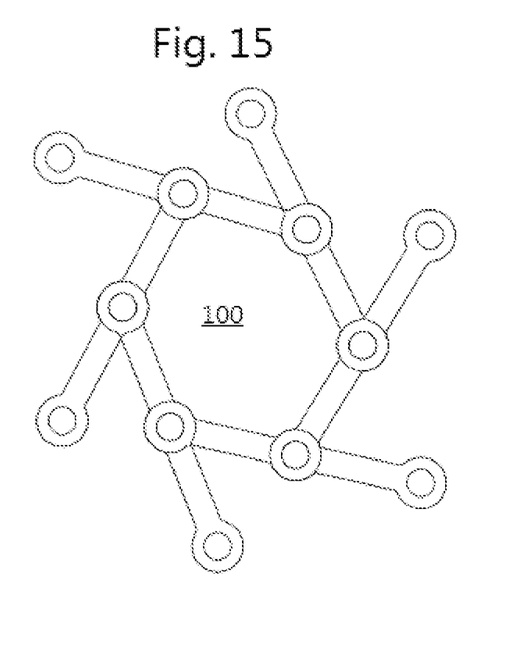
FIG. 15 is a top plan view showing how the unique struts of the present invention can be attached together to form another irregularly shaped weight bearing surface.

In a further embodiment of the present invention, when the first connector 14a and the second connector 14b are removably connected, they lock into place after at the struts 10 are arranged into a desired position. A comparison of FIGS. 2, 3 and 4 clearly indicate that a positioning of the dolly assembly 100, from the operative position or orientation of FIG. 3 into the collapsed position or orientation of FIG. 4, involves the rotational or pivotal movement of each of the interconnected struts 10 relative to one another and about the longitudinal axis 20 of the interconnecting connector assemblies. More specifically, each interconnecting connector assembly comprises the first connector 14a positioned or threaded through aligned ones of the holes 13 in each of the connected struts 10 and thereafter being attached to the second connector 14b.

In another preferred embodiment the termination members 18 are substantially planar.

In yet a another embodiment of the present invention, the first 12, second 12, and third through holes 13 of each strut 10 are approximately of the same diameter.

As seen in FIGS. 7-15, the linearly planar struts may be joined together to form irregularly shaped collapsible configurations.

An advantage of the present invention is that it provides a dolly that is collapsible.

Another advantage of the present invention is that it provides a dolly that is manipulated into different shapes, thereby allowing users to transport oblong structures.

Yet another advantage of the present invention is that it provides a dolly that is easily assembled.

A further advantage of the present invention is that it provides a dolly that does not require tools to assemble it.

Yet a further advantage of the present invention is that is provides a modular dolly kit that can be extendable by the user by simply adding modules to the dolly.

Although the present invention has been described in considerable detail in reference to preferred versions, other versions are possible. Therefore, the spirit and scope of the appended claims should not be limited to the description of the preferred versions contained herein.

What is claimed is:

1. A modular dolly assembly comprising:
    a plurality of at least two struts each including a plurality of holes extending there through,
    a plurality of connector assemblies,
    said two struts disposable in an operative orientation comprising said plurality of connector assemblies removably connected to said two struts,
    said operative orientation further comprising at least some of said connector assemblies extending through aligned ones of said plurality of holes of each of said two struts in removable interconnecting relation to said two struts,
    said operative orientation further comprising at least some others of said plurality of connector assemblies extending through non-aligned ones of said plurality of holes of said two struts, and
    a plurality of casters each connected to a different one of said plurality of connector assemblies extending through said aligned ones and said non-aligned ones of said holes of said two struts, in supporting relation to said two struts.

2. A modular dolly assembly as recited in claim 1 wherein at least some of said plurality of connector assemblies comprise a first connector and a second connector removably attachable to one another; said plurality of castors each connected to a corresponding one of said second connectors of said plurality of connector assemblies.

3. A modular dolly assembly as recited in claim 1 wherein corresponding ones of said connector assemblies are cooperatively dimensioned and configured with said aligned ones of said plurality of holes of said two struts to define a substantially pivotal connection of said two struts with one another.

4. A modular dolly assembly as recited in claim 3 wherein said pivotal connection comprises an at least partially rotational movement of said two struts relative to one another in a direction substantially transverse to a longitudinal axis of said one connector assembly.

5. A modular dolly assembly as recited in claim 1 wherein said plurality of holes of each of said two struts comprises a first hole, a second hole and a third hole extending there through; said first and second holes disposed adjacent opposite ends of each of said two struts and said third hole disposed intermediate corresponding ones of said first and second holes.

6. A modular dolly assembly as recited in claim 5 wherein said removable interconnecting relation of said two struts further comprises at least one of said connector assemblies extending through any of said first, second or third holes of one of said two struts disposed in aligned relation with any one of said first, second or third holes of the other of said two struts.

7. A modular dolly assembly as recited in claim 6 wherein each of said first, second and third holes of each of said two struts is cooperatively dimensioned and configured with each of said plurality of connector assemblies to facilitate removable passage of each of said connector assemblies through any of said first, second and third holes.

8. A modular dolly assembly as recited in claim 1 wherein at least some of said plurality of connector assemblies comprise a first connector and a second connector removably attachable to one another; said first connector dimensioned and configured to removably pass through any of said plurality of holes of any of said two struts into removable connection with said second connector, said second connector disposed exteriorly of any corresponding hole through which said first connector is disposed, each of said plurality of casters removably connected to a corresponding one of said second connectors of a corresponding connector assembly.

9. The modular dolly assembly of claim 1 further comprising a termination member, said termination member including two through holes, said termination member removably attachable to one of said struts using one of said connector assemblies.

10. A modular dolly assembly comprising:
a plurality of struts each including a plurality of holes formed there through,
a plurality of connector assemblies each comprising a first connector and a second connector removably attachable to one another,
at least some of said plurality of connector assemblies removably disposed through aligned ones of said holes of said plurality of struts in movably interconnecting relation with corresponding ones of said plurality of struts,
at least some others of said plurality of connector assemblies removably extending through non-aligned ones of said plurality of holes of said plurality of struts,
interconnected ones of said plurality of struts collectively disposable between an operative orientation and a collapsed orientation,
said operative orientation comprising said plurality of struts disposed in spaced, outwardly expanded relation to one another and said collapsed orientation comprising said plurality of struts collectively disposed in a substantially accordion configuration,
movably interconnecting ones of said plurality of connector assemblies extending through said aligned ones of said plurality of holes, in interconnected ones of said plurality of struts, when said plurality of struts are in both said operative orientation and said collapsed orientation, and
a plurality of casters each removably connected to a different one of said plurality of connector assemblies extending through said aligned ones and said non-aligned ones of said plurality of struts in collectively supporting relation to said plurality of struts.

11. A modular dolly assembly as recited in claim 10 wherein each of said connector assemblies is cooperatively dimensioned and configured with said aligned ones of said plurality of holes to define a substantially pivotal connection of interconnected ones of said struts; said pivotal connection comprising a substantially rotational movement of said interconnected struts relative to one another in a direction transverse to a longitudinal axis of an interconnecting one said plurality of said connector assemblies.

12. A modular dolly assembly as recited in claim 10 wherein each of said struts comprises a first hole, a second hole and a third hole extending there through said first and second holes disposed adjacent opposite ends of each of said struts and said third hole disposed intermediate corresponding ones of said first and second holes; said interconnecting relation of said plurality of struts further comprising at least one of said connector assemblies extending through any of said first, second or third holes of one of said plurality of struts disposed in aligned relation with any of said first, second or third holes of another of said plurality of struts.

13. A modular dolly assembly as recited in claim 12 wherein said first, second and third holes of each of said plurality of struts are cooperatively dimensioned and configured with each of said connector assemblies to facilitate removable passage of any of said connector assemblies through any of said first, second and third holes.

14. A modular dolly assembly as recited in claim 13 wherein said first connector of each of said plurality of connector assemblies is dimensioned and configured to removably pass through any of said first, second and third holes of any of said plurality of struts into removable connection with a corresponding second connector, said second connector disposed exteriorly of a corresponding one of said first, second or third holes through which said first connector passes, each of said plurality of casters removably connected to a corresponding one of said second connectors of a corresponding connector assembly.

15. The modular dolly assembly of claim 10 further comprising a termination member, said termination member including two through holes, said termination member removably attachable to one of said struts using one of said connector assemblies.

16. A dolly assembly comprising:
a plurality of struts, each of said struts including a plurality of holes formed there-through and collectively disposable into an assembled relation and a disassembled relation to one another,
said assembled relation comprising said plurality of struts arranged to form a dolly assembly with one of said struts having at least one of said plurality of holes aligned with one of said plurality of holes in another one of said struts so as to removably receive one of a plurality of connector assemblies, wherein each one of said plurality of connector assemblies removably extends through one of said aligned holes in interconnecting relation with said plurality of struts;

said assembled relation further comprising one or more of said plurality of connector assemblies extending through non-aligned ones of said plurality of holes of said struts, said disassembled relation comprising said plurality of struts disconnected from one another, and a plurality of casters, each of said casters removably connected to a different one of said plurality of connector assemblies extending through said aligned holes of said plurality of struts, in collectively supporting relation to said plurality of struts, at least when said plurality of struts are in said assembled relation.

17. A modular dolly assembly comprising:

a plurality of struts each including a plurality of holes formed there through, a plurality of connector assemblies structured to be removably disposable through aligned ones of said holes in movably interconnecting relation with corresponding ones of said plurality of struts, said plurality of connector assemblies further structured to be removably disposable through non-aligned ones of said plurality of holes of said plurality of struts, interconnected ones of said plurality of struts collectively disposable into and out of an operative orientation, said operative orientation comprising corresponding ones of said plurality of connector assemblies extending through said aligned ones of said plurality of holes in movably interconnecting relation to connected ones of said plurality of struts, and a plurality of castors each removably connected to a different one of said plurality of connector assemblies extending through said aligned ones and said non-aligned ones of said holes of said plurality of struts, in collectively supporting relation to said plurality of struts, at least when said plurality of struts are in said operative orientation.

18. The modular dolly assembly of claim 17 further comprising a termination member, said termination member including two through holes, said termination member removably attachable to one of said struts using one of said connector assemblies.

* * * * *